Nov. 21, 1950     H. W. JEWELL ET AL     2,530,700
PRESSURE PIPE JOINT
Filed Nov. 3, 1947
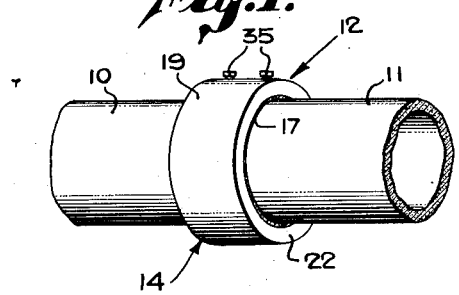
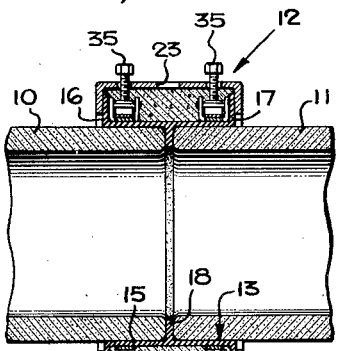
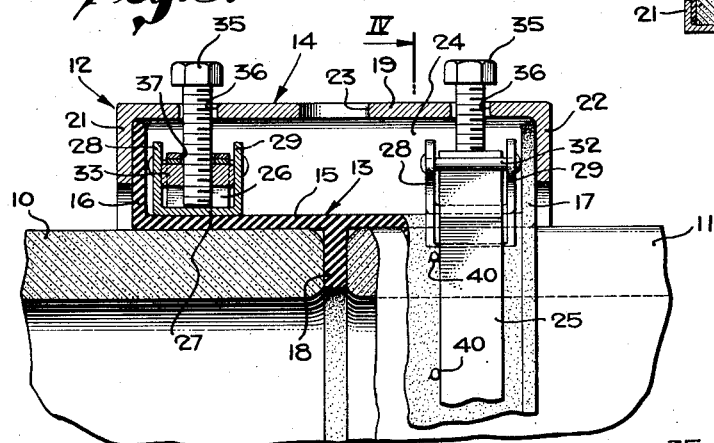
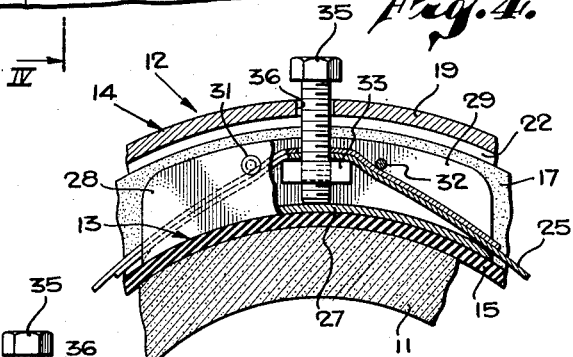
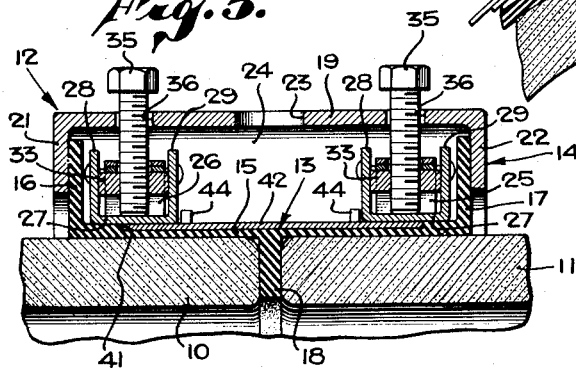
HOWARD W. JEWELL
WILLIAM G. CALDER
RAYMOND B. STRINGFIELD
INVENTORS.
BY 
ATTORNEY Patented Nov. 21, 1950

2,530,700

UNITED STATES PATENT OFFICE 2,530,700

PRESSURE PIPE JOINT

Howard W. Jewell, William G. Calder, and Raymond B. Stringfield, Los Angeles, Calif., assignors to Joints, Inc., Los Angeles, Calif., a corporation of California Application November 3, 1947, Serial No. 783,800

10 Claims. (Cl. 285—193)

This invention relates to a pipe coupling and, more particularly but not necessarily, to a pipe coupling for use with ceramic pipe.

Ceramic pipe, such as burned clay pipe or cement-asbestos composition pipe, when used in pressure lines has a tendency to split longitudinally form its ends toward the middle. Also, where the adjacent ends of the pipe are abutted against each other, the ends of the pipe generally chip. Chipping is also often experienced when the pipe is not properly suported or the pipe becomes undermined and unsupported and causes relative movement of the adjacent pipe ends. The longitudinal splitting of the pipe ends is due to the usual pipe coupling not uniformly gripping the adjacent surfaces of the pipe ends, and it is therefore one object of this invention to provide a pipe coupling that will positively grip the adjacent ends of pipe uniformly and resiliently so that chipping and splitting of the pipe ends will be obviated.

Another object is to provide a pipe coupling connecting the adjacent ends of ceramic pipe that will maintain the adjacent ends of the pipe in spaced relation by a resilient member and thereby prevent chipping of the pipe ends.

Another object is to provide a pipe coupling having the above characteristics that may be sealed with cement or waterproof composition subsequent of the installation of the pipe coupling and thereby prevent fouling of the interior of the pipe-line when the pipe is laid in wet ditches.

Another object is to provide coupling means whereby sections of pipe may be coupled in a resilient manner on the surface adjacent a ditch, the coupled sections lowered into a ditch and then provided with a poured cement or composition collar which will hold the sections in position. These advantages are particularly notable where the ditch is wet, where it is desirable to maintain the interior of the new pipe-line clean, and where the pipe-line is being laid in a gradually curving ditch.

A further object is to provide a pipe coupling having the above characteristics wherein the coupling is possessed of sufficient resiliency to permit misalignment of the pipes without subjecting the ends of the adjacent pipes to contact with one another.

A still further object is to provide a pipe coupling having the above characteristics that will be durable, efficient in operation, easy to install and comparatively cheap to manufacture.

The above and other objects will be made apparent throughout the further description of the invention when taken in connection with the accompanying drawings, wherein like reference characters refer to like parts. It is to be distinctly understood that the drawings are not a definition of the invention but merely illustrate exemplary forms by means of which the invention may be effectuated.

Referring to the drawings:

Fig. 1 is a perspective view of a coupling embodying the invention shown assembled on the adjacent ends of pipes.

Fig. 2 is a vertical sectional view of the assembly shown in Fig. 1.

Fig. 3 is an enlarged view similar to Fig. 2 partly in section and partly in elevation in order to show details of the clamping means.

Fig. 4 is a sectional view taken along the line IV—IV of Fig. 3.

Fig. 5 is a detailed sectional view illustrating a modification embodied in the invention.

Referring to the drawings, 10 and 11 indicate two pipes having their adjacent ends coupled together by the present coupling, indicated in its entirety by 12. The coupling consists of an inner member represented in its entirety by 13 and an outer member represented in its entirety by 14. The inner member 13 consists of a cylindrical body member 15, the edges of which terminate in flanges 16 and 17, forming an external annular channel. The inner member 13, which is preferably made of a resilient compressible material such as a rubber or synthetic rubber composition, has a centrally located, inwardly extending annular flange 18. The interior diameter of the inner member 13 is preferably slightly less than the external diameter of the pipe ends so that when the pipes 10 and 11 are inserted in the opposite sides or ends of the member 13, the resilient member 13 will give sufficiently to receive the pipe ends and exert a uniform resilient grip around the adjacent end surfaces of the exterior of the pipe ends. The flange 18 provides a resilient compressible connection between the adjacent ends of the pipes and protects the ends of the pipes from shear and breakage when the laid or connected pipe-line is undermined or unsupported. The width of flange 18 is preferably sufficient to extend virtually to the inner surfaces of pipes 10 and 11, thereby preventing the accumulation of foreign matter in the joints when the pipe is in use.

The outer member 14 consists of an annular body member 19, the side edges of which terminate in flanges 21 and 22, forming an annular channel disposed in opposite relation to the inner annular channel member 13. The member 14 may be of sufficient length to telescope over and be concentrically supported by the flanges 16 and 17 of the member 13, thereby forming a closed annular chamber or compartment 24. The space between flanges 21 and 22 is preferably such that flanges 16 and 17 of inner member 13 press against or contact the inner surfaces of flanges 21 and 22. Member 14 may be made of papier-mache impregnated or coated with asphalt or other waste resisting composition, or of any other inexpensive but satisfactory material. The member 14 may be provided with an opening 23 into which cement may be poured into the compartment 24.

Clamping means is provided for uniformly clamping the member 13 about the adjacent ends of the pipes. The clamping means consist of bands 25 and 26 extending around the member 13 and adjacent the ends of the pipes 11 and 10, respectively. Means is provided for clamping the bands into rigid, uniform relation with the member 13 and compressing the same about the adjacent ends of the pipes. The means for clamping each of the bands on the pipe consists of a channel member having a curved bottom 27 and side flanges 28 and 29. A pair of bolts, rods or rollers 31 and 32 extend across the channel and connect the side flanges 28 and 29. The rods 31 and 32 are disposed in spaced relation and substantially equidistant from the center of the channel. A threaded member, such as a square nut 33, is movably disposed within the center of the channel and between the rods 31 and 32. The bands 25 and 26 are then positioned around the member 15 and have their ends overlapping above the threaded member 33 and below the rods 31 and 32. A threaded stud 35 extending through an opening 36 in the member 14 extends through cooperating, aligned openings 37 in the overlapping end portions of the band and extends into engagement with the threaded member 33. It can now be understood that as the member 35 is threaded into the member 33, the lower end of member 35 will rest against the bottom 27 of the clamp channel, and as the nut is carried upwardly on the threads, the overlapping end portions of the band will be drawn upwardly between the rods or rollers 31 and 32 and draw the band into tensed, rigid, uniform relation, compressing and clamping member 13 onto the cooperating end of the pipe. Similar clamping means is provided for clamping each end of the member 13 on the adjacent pipe ends. It will be noted that the compressive force of the bands is distributed over an area much wider than the bands themselves by reason of the inner member 13.

The coupling may be positioned onto the ends of the pipes in assembled condition as shown by the drawings, it being necessary only to loosen the threaded means 35 during the positioning of the ends of the pipe into the coupling and thereafter the bands tightened by actuating the threaded member 35, after which time the annular chamber or compartment 24 may be filled with a rust-preventing cement for rendering the joint substantial and rigid while at the same time protecting the bands 25 and 26 from rusting. Sulfur-silica cement, hydraulic or Portland cements and resinous cementing compositions capable of setting, can be used.

For the purpose of aligning the bands 25 and 26 around the annular bottom 15 there is provided spaced nipples or beads 40 circumferentially disposed around the member 13 as best seen in Fig. 3. These nipples 40 are preferably integral with member 13 and are similarly disposed in relation to each of the bands 25 and 26. These nipples 40 permit the bands to remain in position while loosely in engagement with member 15.

In the modification illustrated by Fig. 5, the exterior surface of the annular member 15 is recessed, as shown at 41. The recess is annular in shape and extends around the exterior surface of the member 15 and is adapted to receive a metal or stiffening load-distributing band 42. The band 42 extends under the channel-shaped clamps and the bands 25 and 26 engage the opposite ends of the band 42, whereby the latter is clamped into compressed relation with the annular bottom 15 of the member 13. The channel-shaped clamps may be spot-welded to the band 42 or the band 42 may be provided with spaced rims or projections 44 for maintaining the channel-shaped clamps in proper spaced relation.

The construction here described permits the use of ceramic pipe not only in gravity lines but also for use in lines carrying considerable pressure. Water, gas sewage, industrial wastes, and other liquids can be readily handled.

It is to be understood that the load or pressure distributing band 42 need not extend completely around sleeve member 15. It has been found that assembly and positioning of the clamps and bands 25 and 26 within the device is facilitated by connecting the bottoms 27 of the two clamps by means of two strips of metal one under each end portion of such bottom (and extending somewhat beyond the ends) such strips assuming a position parallel to the axis of the pipes to be connected. A similar strip (or strips) may be spot welded to connect the bands 25 and 26 at a point on the other side of the sleeve (diametrically opposite the clamps). Such construction, in use, forms a firm connection between the two clamps and bands and imparts great strength and rigidity to the joint.

It will be also noted that the wall 19 of outer member 14 need not have separate ports 23 and 36 but instead one large port capable of accommodating the bolts 35 and also arranged to receive cement, etc., may be used.

While we have illustrated and described certain forms of the invention, it will now be apparent to those skilled in the art that certain changes, additions and omissions may be made in the exemplary forms shown without departing from the spirit and scope of the appended claims.

We claim:

1. A coupling for connecting the adjacent ends of pipes including: inner and outer oppositely disposed annular-shaped channel members arranged in telescoping relation and forming an annular chamber, and means located within said chamber having means extending exteriorly of said chamber for clamping the coupling on the adjacent ends of pipes.

2. A coupling for connecting the adjacent ends of pipes in accordance with claim 1 wherein the said inner channel member is composed of a resilient compressible material.

3. A coupling in accordance with claim 1 wherein the said inner channel member is composed of a resilient compressible material having a centrally located inwardly extending annular flange arranged to lie between the adjacent ends of the pipes.

4. A coupling in accordance with claim 1 wherein the first said means includes a pair of bands for clamping the inner channel member about the adjacent ends of the pipes, and a sealing means in said chamber.

5. A coupling in accordance with claim 1 wherein the first said means includes a pair of bands for clamping the inner channel member about the adjacent ends of the pipes and a load-distributing band.

6. A coupling for connecting the adjacent ends of pipes including: an inner annular channel, an outer annular channel disposed in opposite relation to said inner channel, the said channels being in telescoping relation and forming an annular chamber, and an external inwardly extending flange carried by said inner channel and located centrally thereof for separating the adjacent ends of pipes inserted in opposite ends of said annular chamber.

7. A coupling in accordance with claim 6 wherein means located within said chamber is arranged to clamp the inner channel uniformly and resiliently about the adjacent ends of pipes.

8. A coupling in accordance with claim 6 wherein said inner annular channel is constructed of a resilient compressible material, and including clamping means comprising a load-distributing band, two clamping bands and tightening means.

9. A coupling for connecting the adjacent ends of pipes comprising: a chamber including an annular member composed of a resilient compressible material having an inwardly extending annular flange arranged to lie between adjacent ends of the pipes being connected, a pair of bands within said chamber adapted to encircle adjacent ends of the pipes and means for tightening said bands.

10. A coupling in accordance with claim 9 including a load-distributing band encircling said pipes outside said resilient annular member.

HOWARD W. JEWELL.
WILLIAM G. CALDER.
RAYMOND B. STRINGFIELD.

REFERENCES CITED

The following references are of record in the file of this patent:

UNITED STATES PATENTS

| Number | Name | Date |
|---|---|---|
| 369,574 | Wilbur | Sept. 6, 1887 |
| 1,898,623 | Gammeter | Feb. 21, 1933 |